(12) United States Patent
Gassner et al.

(10) Patent No.: US 7,147,216 B2
(45) Date of Patent: Dec. 12, 2006

(54) DAMPER, ESPECIALLY FOR MOVABLE FURNITURE PARTS

(75) Inventors: Daniel Gassner, Feldkirch (AT); Bernhard Krammer, Höchst (AT)

(73) Assignee: Julius Blum GmbH, Hochst (AT)

( * ) Notice: Subject to any disclaimer, the term of this patent is extended or adjusted under 35 U.S.C. 154(b) by 0 days.

(21) Appl. No.: 11/192,015

(22) Filed: Jul. 29, 2005

(65) Prior Publication Data
US 2005/0279596 A1 Dec. 22, 2005

Related U.S. Application Data

(63) Continuation of application No. PCT/AT03/00367, filed on Dec. 11, 2003.

(30) Foreign Application Priority Data

Jan. 30, 2003 (AT) ................ GM43/2003

(51) Int. Cl.
B60G 13/00 (2006.01)
(52) U.S. Cl. ............ 267/201; 267/153; 248/406.2
(58) Field of Classification Search ............ 267/201, 267/205, 134, 153, 195, 196; 248/575, 406.2
See application file for complete search history.

(56) References Cited

U.S. PATENT DOCUMENTS

| | | | |
|---|---|---|---|
| 2,229,750 A | 1/1941 | Lindstrom | |
| 2,705,634 A | 4/1955 | Sampson et al. | |
| 3,297,284 A | 1/1967 | Pellerin | |
| 3,796,288 A | 3/1974 | Holinagel | |
| 3,856,285 A | 12/1974 | Yamada | |
| 4,979,595 A | 12/1990 | Paton | |
| 5,133,435 A | 7/1992 | Taylor | |
| 5,535,861 A * | 7/1996 | Young | 267/201 |
| 5,595,268 A * | 1/1997 | Paton | 188/271 |
| 6,672,575 B1 * | 1/2004 | Flower et al. | 267/205 |
| 2002/0088677 A1 | 7/2002 | Fitz et al. | |
| 2003/0200625 A1 | 10/2003 | Zimmer | |

* cited by examiner

*Primary Examiner*—Melanie Torres
(74) *Attorney, Agent, or Firm*—Wenderoth, Lind & Ponack, L.L.P.

(57) ABSTRACT

A damper has a cylinder and a piston, the piston having two or more parts. A first piston part is made of a rubber-elastic material forced against the cylinder wall during a damping stroke. A second piston part is made of a material that is stiffer in comparison to the rubber-elastic material. The second piston part as seen in the radial direction lies between an area of the first piston part and the cylinder wall. The first piston part may have at least two sections of different hardnesses over its lengths. The piston could also include a piston part that is radially forced outwards to rub against the cylinder wall during damping, the piston part being made as a solid body of a material with rubber-elastic properties which becomes flattened under pressure, deforming in such a way that a friction seal is created between the piston part and the cylinder wall.

51 Claims, 10 Drawing Sheets

DAMPER, ESPECIALLY FOR MOVABLE FURNITURE PARTS

REFERENCE TO RELATED APPLICATION

This is a continuation of PCT/AT2003/000367, filed Dec. 11, 2003 and designating the United States.

BACKGROUND OF THE INVENTION

The invention relates to a damper, especially for movable furniture parts, with a cylinder and a piston movable therein. The piston comprises two or more parts, including a first piston part consisting of rubber-elastic material which is forced against the cylinder wall during the damping stroke, and including a second piston part consisting of a material which is stiffer in comparison to the rubber-elastic material, especially a rigid material.

SUMMARY OF THE INVENTION

It is an object of the invention to improve the braking behavior of the piston of such a damper and to reduce its wear.

The object of the invention is met in that the second piston part—seen in a radial direction—lies between an area of the first piston part and the cylinder wall.

One embodiment of the invention provides that the first piston part is taken up in a frontal recess of the second piston part.

In a further embodiment of the invention, provision is made that the first piston part has a snap ring groove in the area adjacent to the second piston part.

A further embodiment of the invention makes provision that the second piston part encircles the mantle of the first piston part in the manner of a belt, whereby for preference the second piston part is designed as a network which encircles the first piston part.

A further preferred embodiment of the invention makes provision that the first piston part has at least two, preferably more, sections of different hardness over its length.

A further preferred embodiment of the invention provides that the piston is produced in the form of a solid body made from a material with rubber-elastic properties and becomes flattened under pressure whereby it deforms in such a way that a friction seal is created between the piston part and the cylinder wall.

BRIEF DESCRIPTION OF THE DRAWINGS

Various embodiments of the invention will be described with the aid of the figures in the attached drawings, which show.

DETAILED DESCRIPTION OF THE INVENTION

In the following, the embodiments will be described in accordance with FIGS. 1 to 18:

The inventive damper, in a conventional manner, includes a cylinder 1 in which a piston 2 is linearly displaceable. The piston 2 in the embodiments according to FIGS. 1 to 16 includes a first piston part 3 made from a rubber-elastic material and a second piston part 4 made from a harder material than the first piston part 3. The second piston part 4 can be made from a plastic, or from a die-cast alloy or similar material. In the embodiments shown, the second piston part 4 is designed integral with a piston rod 5. The piston rod 5 has ribs 6, which improve the guidance of the piston rod 5 in the cylinder 1 and thereby keep the friction between the piston rod 5 and the cylinder 1 low. The first piston part 3 has a main body and a lip 7 on its distal end furthest away from the second piston part 4. The front wall 1' of the cylinder 1 is provided with an opening 8 which allows for the escape of a damping fluid, in this case air, during damping. As shown in, for example, FIG. 3, the piston 2 and the cylinder 1 are shaped and arranged so that, when no pressure is applied in the "F" direction, there is a gap formed between the piston 2 and the wall of the cylinder 1 at least partially around the piston 2.

The first piston part 3 has a peg-type projection 9 by which it is anchored in the second piston part 4. The projection 9 is provided with a spread ring 10, which is taken up in a chamber-shaped recess 11 in the second piston part 4. The projection 9 is axially displaceable in the recess 11 with its spread part 10. The first piston part 3 and the sealing lip 7 are preferably made from a rubber-elastic material, for example from liquid silicon rubber (LSR), thermoplastic elastomer (TPE) or silicon rubber. The range of hardness of the first piston part 3 preferably lies between 40 A and 85 A Shore.

The second piston part 4 has a three-dimensionally curved (i.e., concave) frontal recess 13, which is designed at least approximately in the form of a spherical cap. The first piston part 3 is arranged with its base end in this recess 13. The base end 14 of the first piston part 3 can be designed either cylindrically or as a truncated cone.

In the ready position, i.e. when no force is acting upon the piston rod 5 and thus the second piston part 4 is not being forced against the first piston part 3, the base end 14 of the first piston part 3 does not completely fill the recess 13. As can be seen, for example, from FIG. 3, the end 14 of the piston part 3 protrudes over approximately half the radius of the recess 13 into the recess 13.

Figure 1:
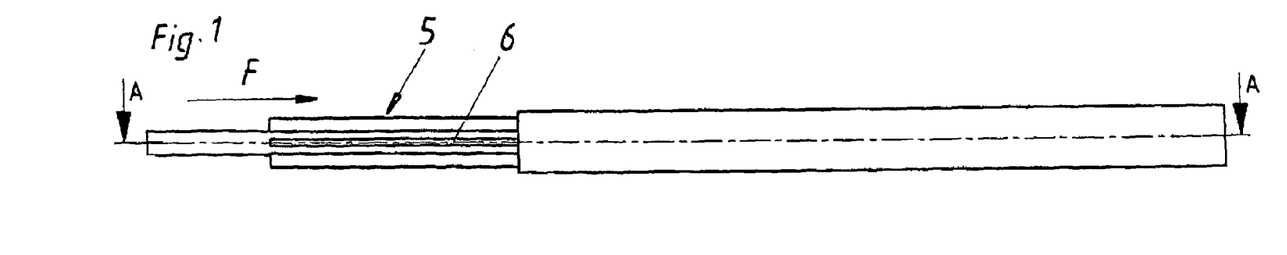
FIG. 1 is a side view of an inventive damper.
Figure 2:
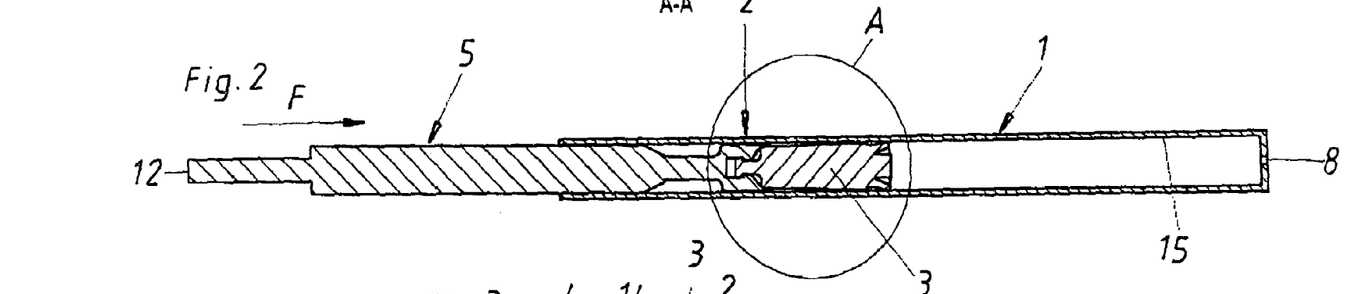
FIG. 2 is a section view along line A—A of FIG. 1.
Figure 3:
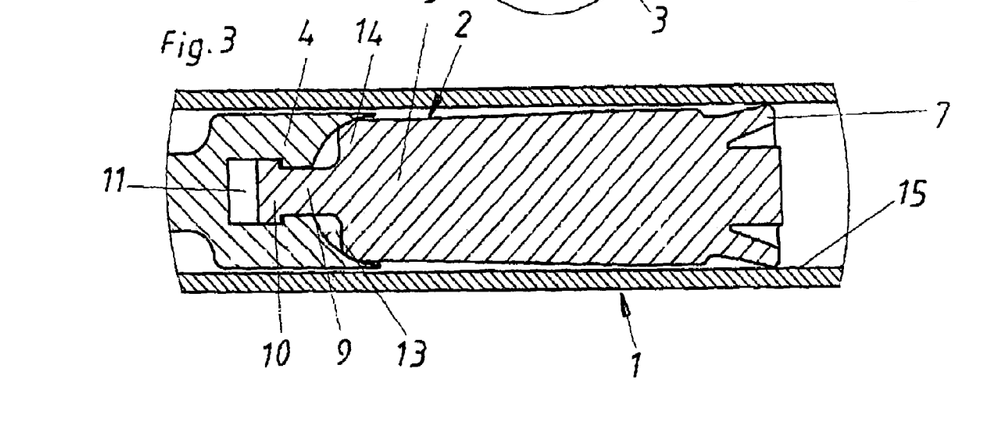
FIG. 3 is section view A from FIG. 2.
Figure 4:
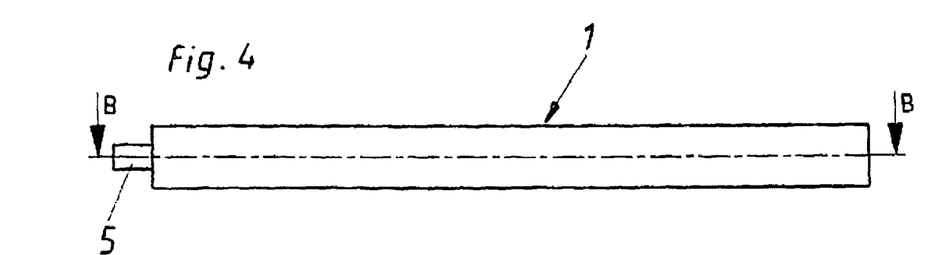
FIG. 4 is a side view of an inventive damper after damping has been effected.
Figure 5:
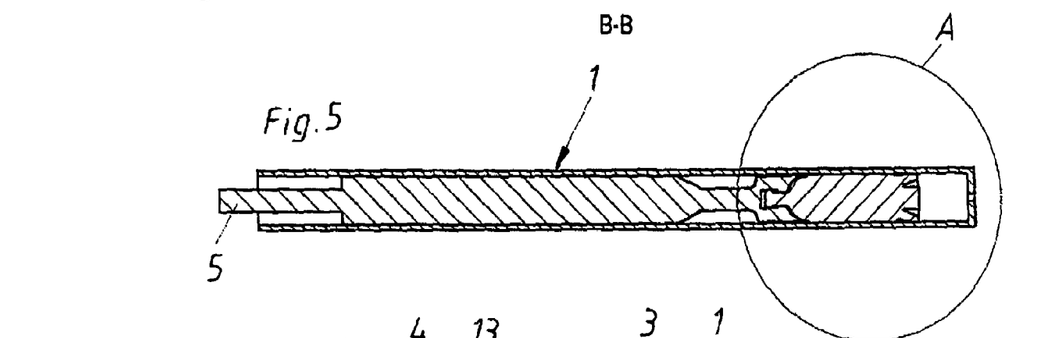
FIG. 5 is a section view along line B—B of FIG. 4.
Figure 6:
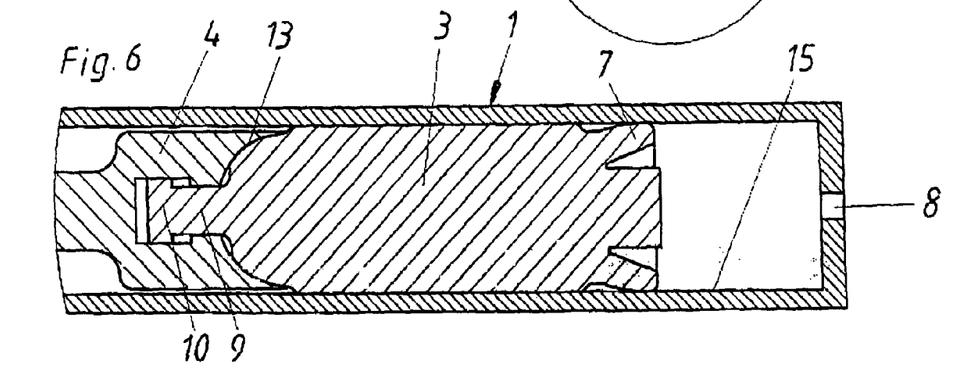
FIG. 6 is a section view A from FIG. 5.

If a force is exerted on the end 12 of the piston rod 5, the piston rod 5 and the piston 2 are moved in the direction of the arrow F. Due to the resistance of the damping medium, for example air, the first piston part 3 is compressed by deformation during the damping process as shown in FIGS. 5 and 6 and thereby radially expanded. As a result of this expansion a friction seal is created between the main body of the first piston part 3 and the cylinder wall 15. The resistance of the damping medium is further increased by the sealing lip 7 of the first piston part 3, and the lip 7 abuts against the cylinder wall 15 from the start of the motion of the piston (i.e., which always abuts against the cylinder wall to provide a constant sealing effect).

During this damping motion, the base end 14 of the first piston part 3 is pressed into the recess 13, until, as shown in FIGS. 5 and 6, it is taken up more or less completely in the recess (i.e., substantially fills the recess 13). Due to the fact that the base end 14 of the first piston part 3 is taken up in the recess during damping, the first piston part 3 is deformed and the friction forces between the first piston part 3 and the cylinder wall 15 are distributed over the entire length of the first piston part 3. Thus, peak forces are prevented in the area where the first piston part 3 rests on the second piston part 4. The first piston part 3 is advantageously tapered conically from the sealing lip 7 towards the base end 14, which additionally contributes to a distribution of the friction forces.

Figure 7:
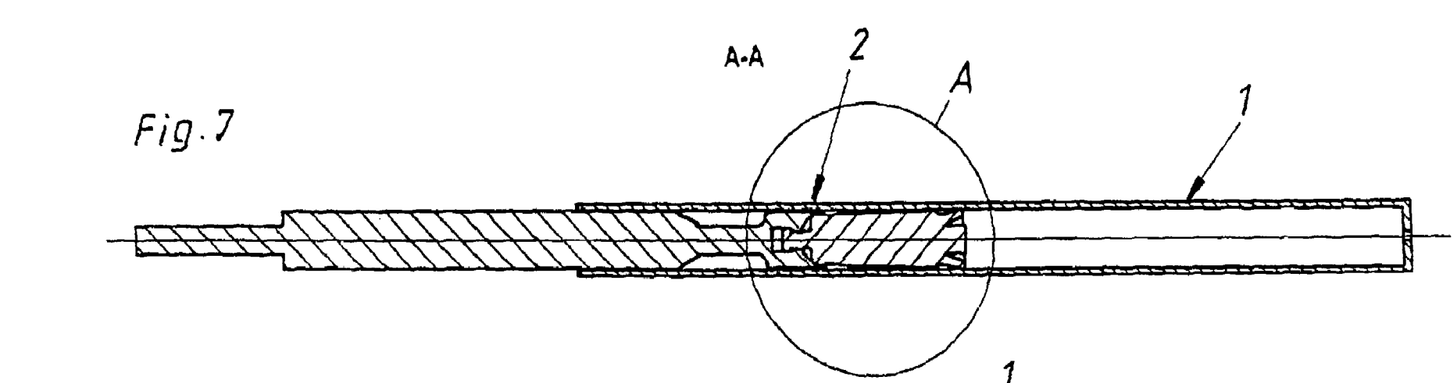
FIG. 7 is a section view along line A—A of FIG. 1, wherein a further embodiment of a piston is shown.
Figure 8:
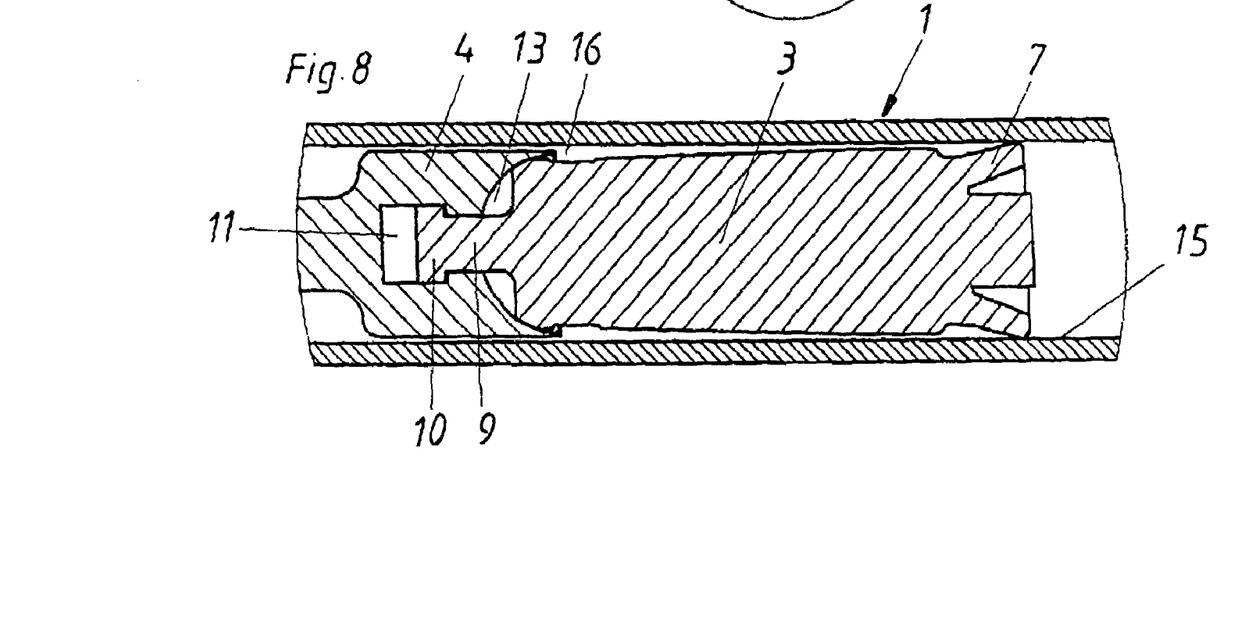
FIG. 8 is a section view A from FIG. 7.

In the embodiment according to FIGS. 7 and 8, the first piston part 3 is provided with a snap ring groove 16 near its base end 14. The snap ring groove 16 contributes to the further unloading of the friction forces in the rear area of the first piston part 3. It is essential that during the entire damping process, a part of the second piston part 4, which is the harder piston part, lies between the base end 14 of the softer first piston part 3 and the cylinder wall 15 with respect to the radial direction. The softer piston part 3 thus cannot be forced against the cylinder wall 15 over its entire length.

Figure 9:
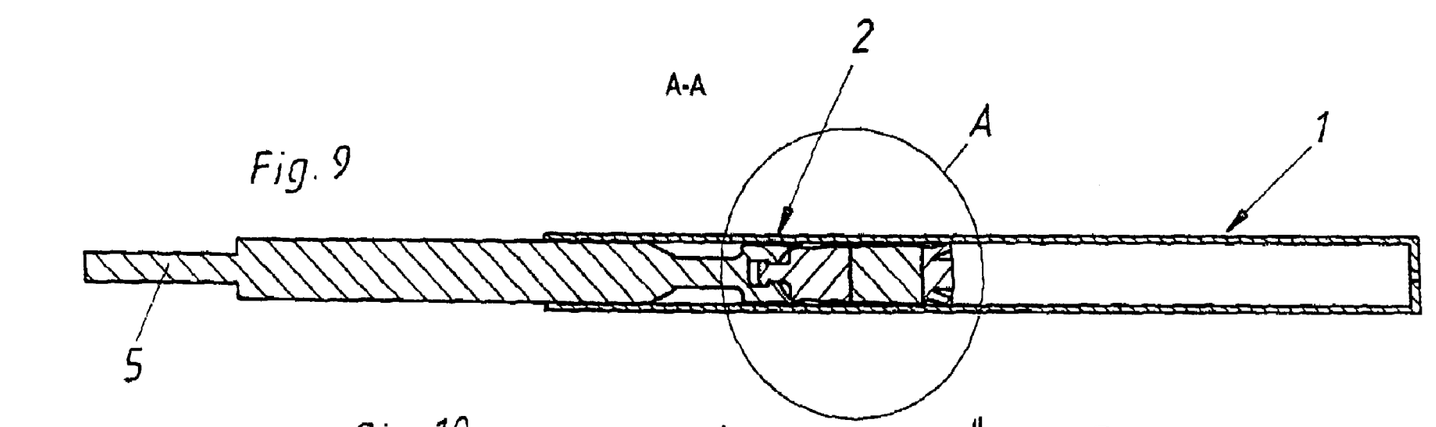
FIG. 9 is a section view along line A—A of FIG. 1, wherein a further embodiment of a piston is shown.
Figure 10:
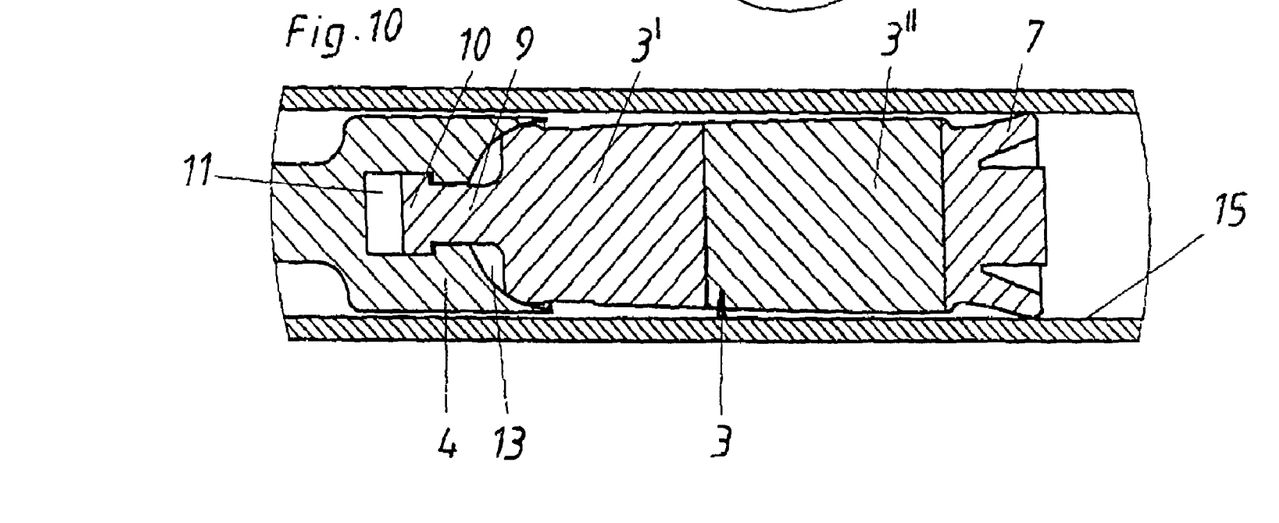
FIG. 10 is a section view A from FIG. 9.

In the embodiment according to FIGS. 9 and 10, the first piston part 3 comprises two sections 3', 3" of different hardnesses. The distal section 3" lying nearer to the lip 7 gives way more quickly because it is made from a softer material. The intended result of this is that the entire surface of the piston part 3 abuts against the cylinder wall 15 right from the start of the braking process. This effects a more even distribution of force over the piston part 3. This results in smaller peak forces during the braking process and less wear.

Figure 11:
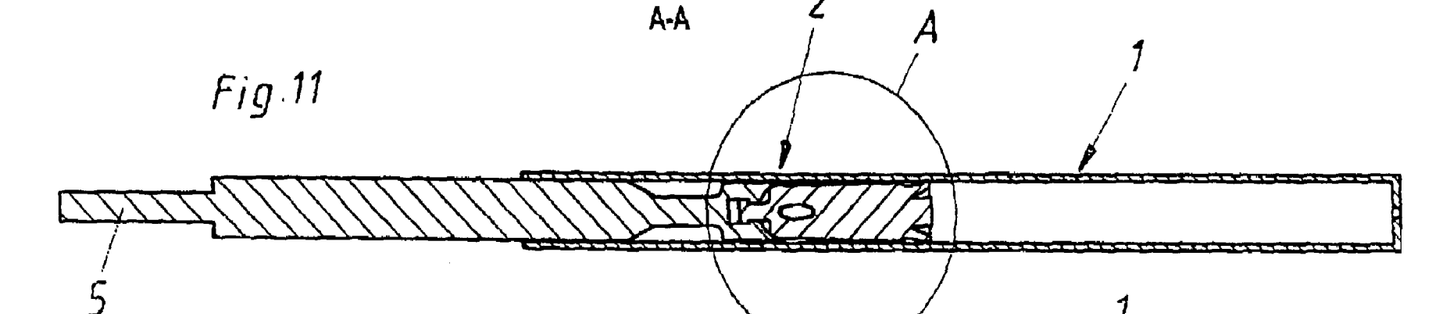
FIG. 11 is a section view along line A—A of FIG. 1, wherein a further embodiment of a piston is shown.
Figure 12:
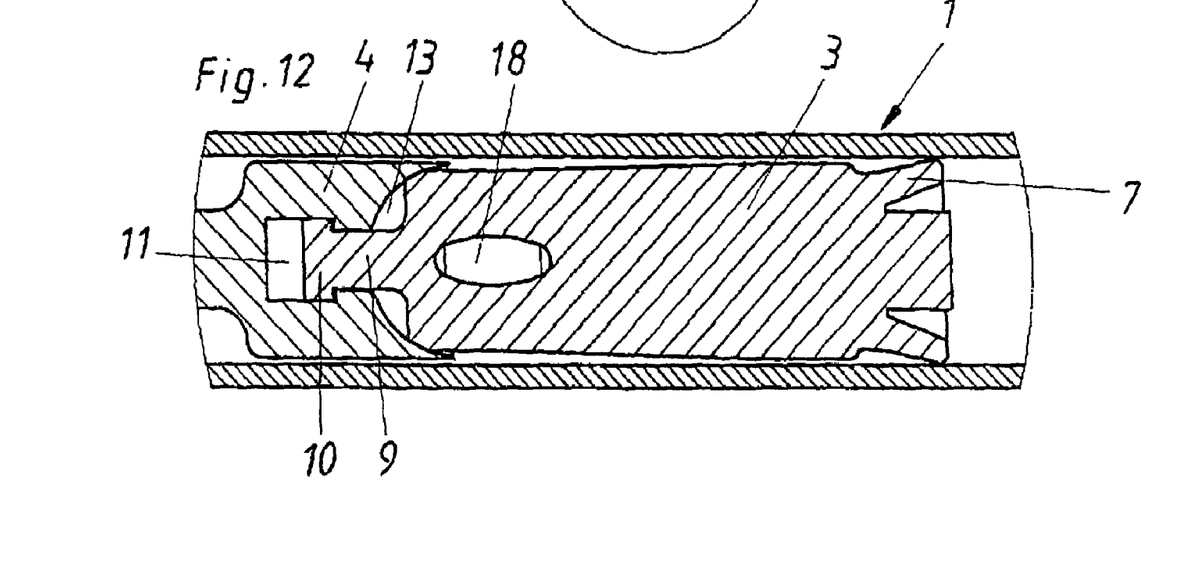
FIG. 12 is a section view A from FIG. 11.

In the embodiment according to FIGS. 11 and 12, the first piston part 3 is provided with a cavity 18, which is located in its rear area, i.e. facing towards the second piston part 4. In other words, the cavity 18 is located at the base end of the first piston part 3. The cavity 18 allows a targeted influence on the surface pressure, thus the distribution of friction force over the piston part 3. The surface pressure is reduced at the site of the cavity 18. Should, for example, the intention be for wear to be minimized by a harder elastomer as the material of the first piston part 3, the annular gap between the piston part 3 and the cylinder wall 15 must be selected to be very small, since harder materials become effective later during the damping process. If no cavity 18 is provided, the small annular gap between the piston part 3 and the cylinder wall 15 can lead to an abrupt braking at the end of the braking/damping path. The result would be an unpleasant braking process.

Instead of a cavity 18, a filling area within the first piston part 3 which is formed of a softer material could also be provided.

Figure 13:
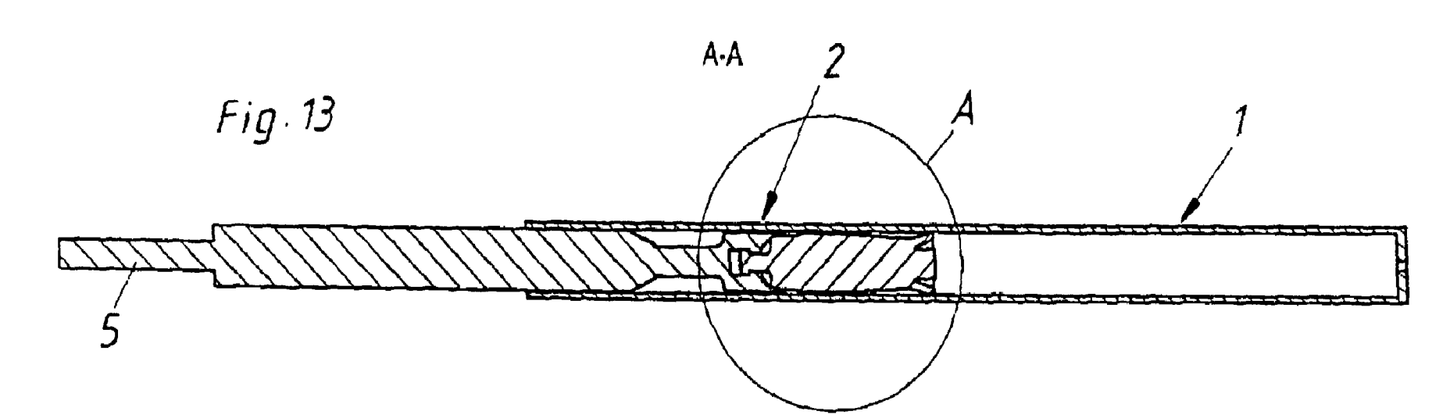
FIG. 13 is a section view along line A—A of FIG. 1, wherein a further embodiment of a piston is shown.
Figure 14:
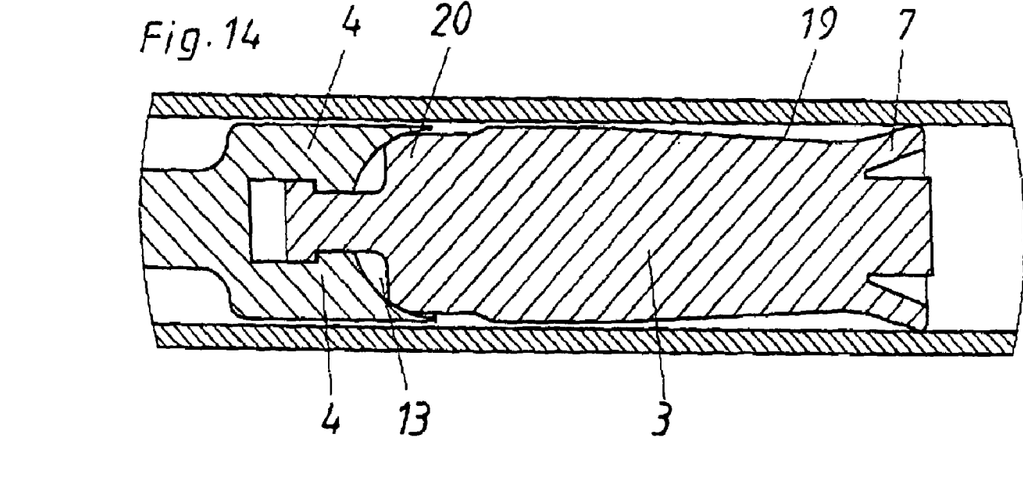
FIG. 14 is a section view A from FIG. 13.

In the embodiment according to FIGS. 13 and 14, the first piston part 3 is provided with a mantle area (i.e., main body portion) 19 tapering conically towards the sealing lip 7. On its base end located towards the second piston part 4, the first piston part 3 has a cylindrical graduation 20. By greater or lesser conicity of the area 19, the surface pressure can be decreased or increased in a controlled fashion over the length of the piston part 3. The graduated section 20 prevents any excessive surface pressure in the area of attachment to the second piston part 4.

Figure 15:
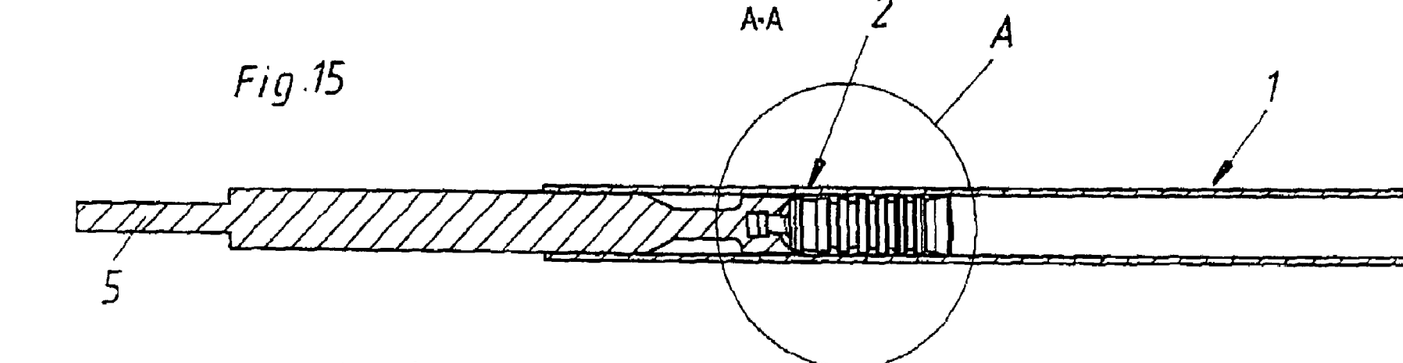
FIG. 15 is a section view along line A—A of FIG. 1, wherein a further embodiment of a piston is shown.
Figure 16:
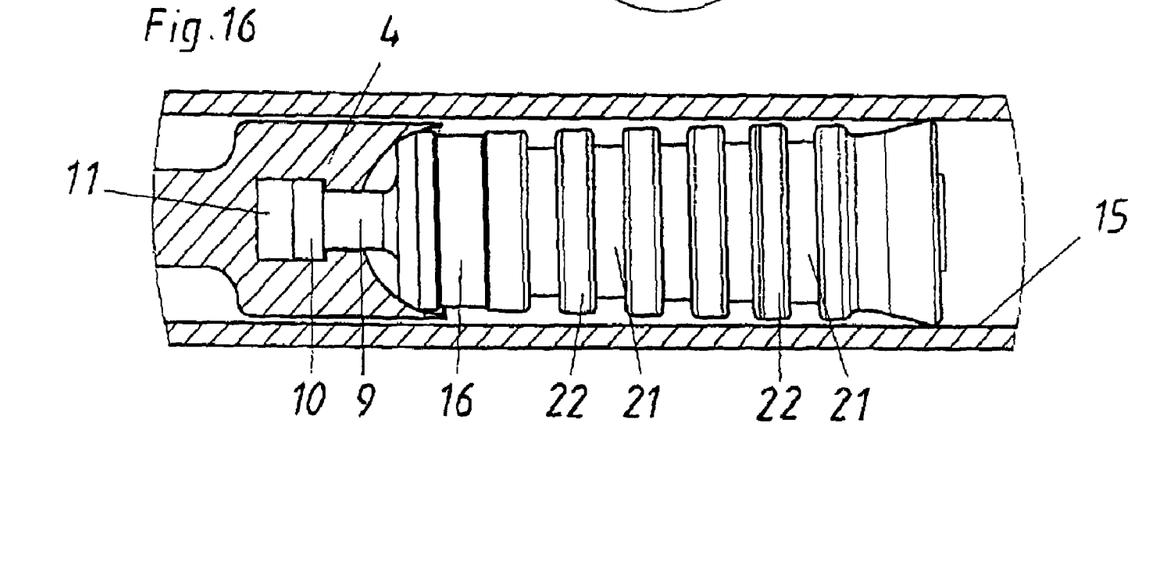
FIG. 16 is a section view A from FIG. 15.
Figure 17:
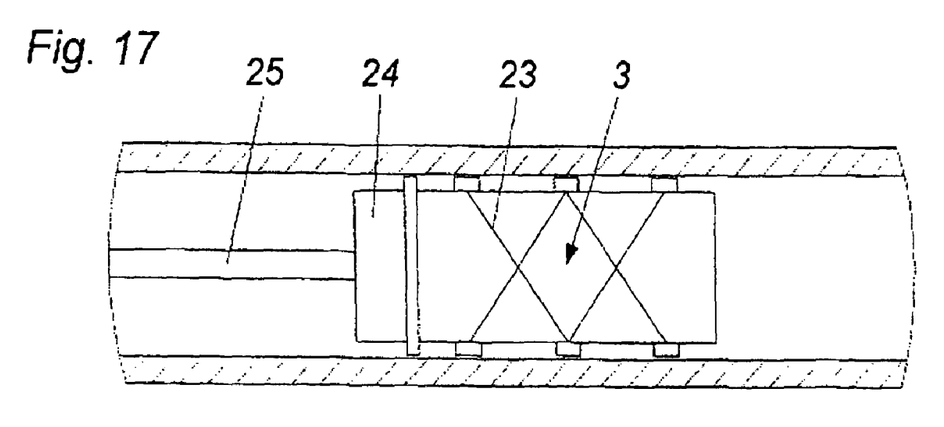
FIG. 17 is a longitudinal section view through a cylinder and a piston, showing the piston in the ready position.
Figure 18:
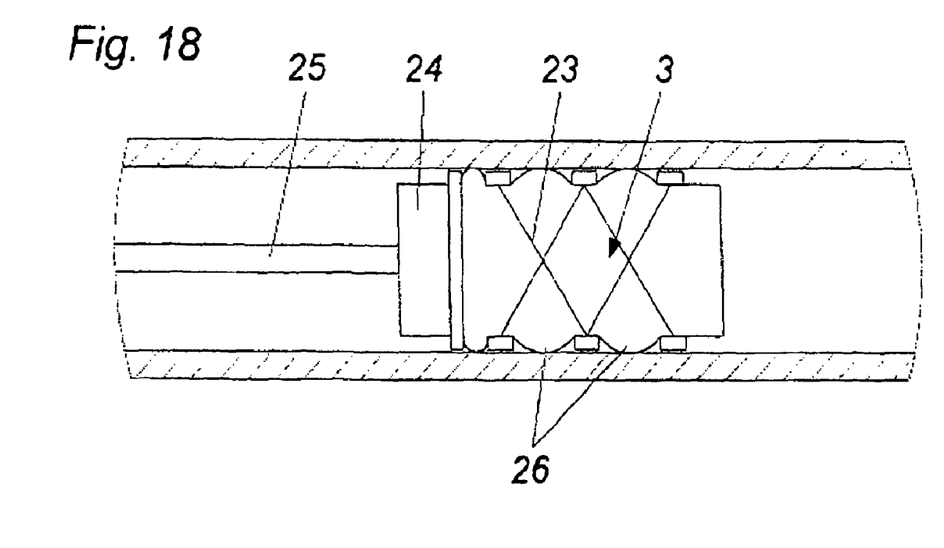
FIG. 18 is a longitudinal section view through a cylinder and a piston, showing the piston in the damping position.

In the embodiment according to FIGS. 15 and 16, the first piston part 3 has several snap ring grooves 21 and several piston lands 22, which alternate over the entire length of the piston part 3. The diameters of the piston lands 22 here decrease in a direction from the sealing lip 7 to the second piston part 4. In the embodiment according to FIGS. 17 and 18, the first piston part 3 is encircled by a network 23. The network 23 is made from a harder material than the piston part 3 and forms the second piston part. The first piston part 3 rests directly on a bolster plate 24 which is connected with a piston rod 25. During the damping process, as can be seen from FIG. 18, bulges 26 of the piston part 3 are pressed against the cylinder wall 15.

In all embodiments, a more even surface pressure of the piston part 3 on the cylinder wall 15 is achieved. This causes less wear and a better braking behavior, i.e. the braking behavior is less abrupt.

In the embodiment according to FIGS. 19 to 24, a cylindrical first piston part 3 abuts against a second piston part 4 which is designed as a bolster plate. In the cylinder 1 there is a compression spring 27, which rests, firstly, on one front wall 1' of the cylinder 1 and secondly on the front side of the piston 2. The second piston part 4 is connected to a piston rod 5. The first piston part 3 is provided at the front with a sealing lip 7, which abuts against the cylinder wall 15. The term "at the front" means in the direction of motion of the piston 2 during the damping process.

The front wall 1' of the cylinder 1 has, in turn, an opening 8, which allows the escape of the damping fluid, in this case, air.

During the damping process, a force acts on the base end 12 of the piston rod 5, and the piston 2 is moved in the direction of the arrow F.

Figure 20:
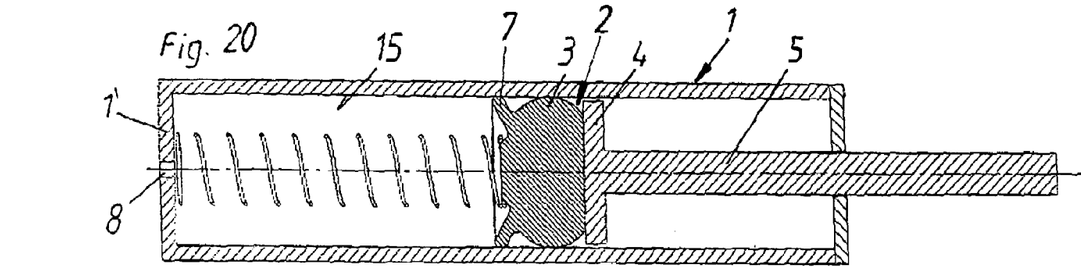
FIG. 20 is a schematically shown section view through the inventive damper, showing the piston during damping.

Due to the resistance of the damping medium, for example air, the first piston part 3 is flattened during the damping process as shown in FIG. 20 and thereby radially expanded. As a result of this expansion, a friction seal is created between the piston part 3 and the cylinder wall 15.

Figure 21:
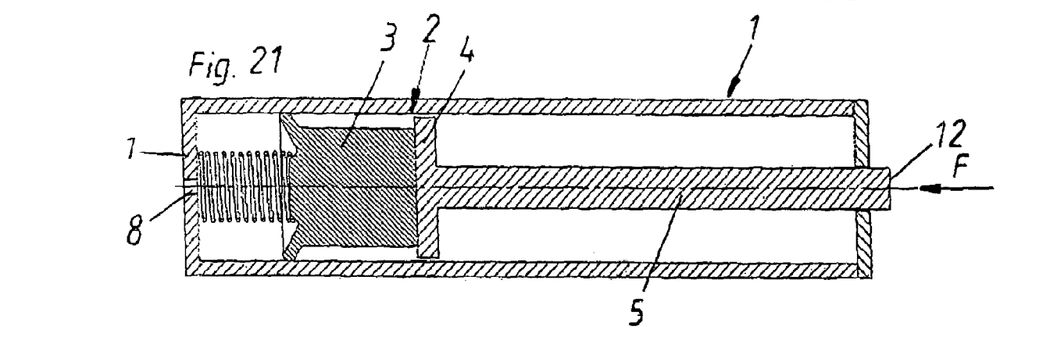
FIG. 21 is a schematically shown section view through the inventive damper, showing the piston at the end of the damping path once damping has been completed.

At the end of the damping path, the first piston part 3 expands in the axial direction due to its own elasticity, whereby the compression spring 27 is further compressed. Since the friction seal between the first piston part 3 and the cylinder wall 15 is cancelled out due to this axial expansion of the piston part 3, the compression spring 27 of the piston 2 can move back into the ready position.

Figure 19:
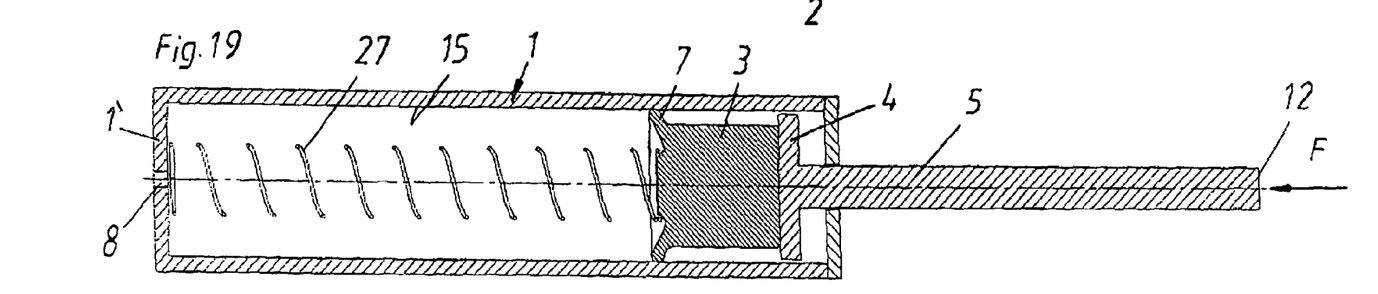
FIG. 19 is a schematically shown section view through a further embodiment of an inventive damper, showing the piston in the ready position.

In the embodiment according to FIGS. 19 to 21, the main body portion of the first piston part 3 and the sealing lip portion 7 form a monolithic (one-piece) body. The first piston part 3 and the sealing lip 7 are in this instance made from a rubber-elastic material, for example from liquid silicon rubber (LSR), thermoplastic elastomer (TPE) or silicon rubber. The range of hardness of the piston preferably lies between 40 A and 85 A Shore.

Figure 22:
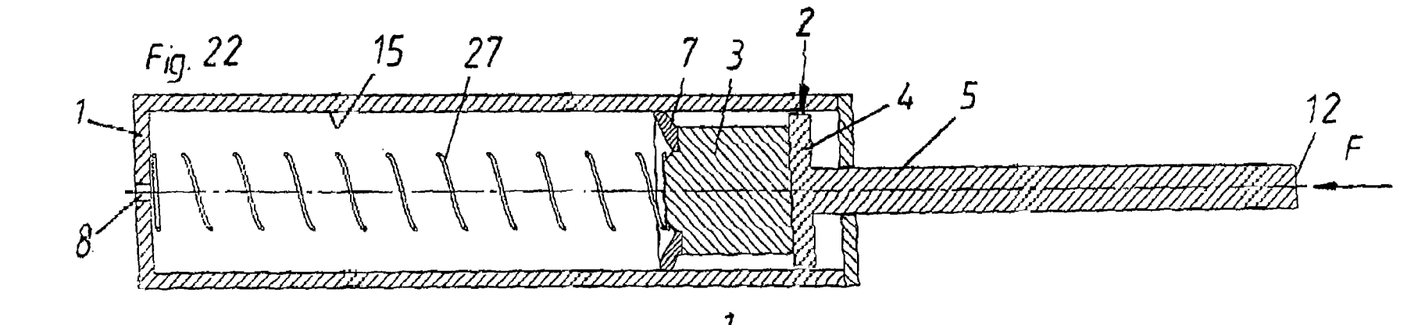
FIGS. 22–24 are views similar to FIGS. 19 to 21 of a second embodiment of the piston.
Figure 23:
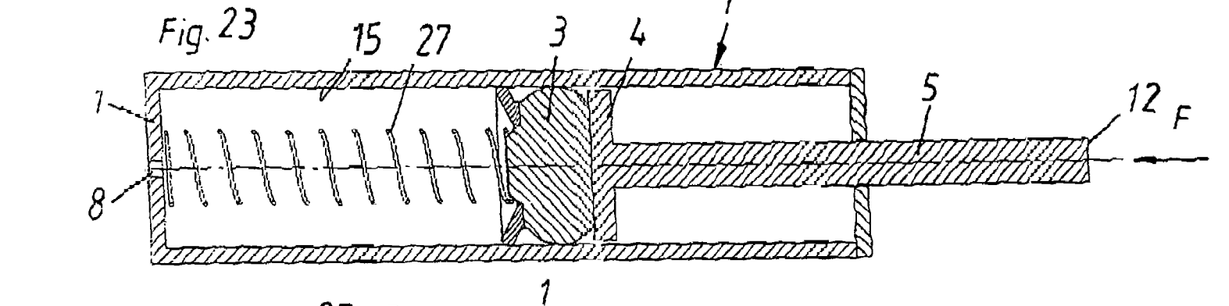
Figure 24:
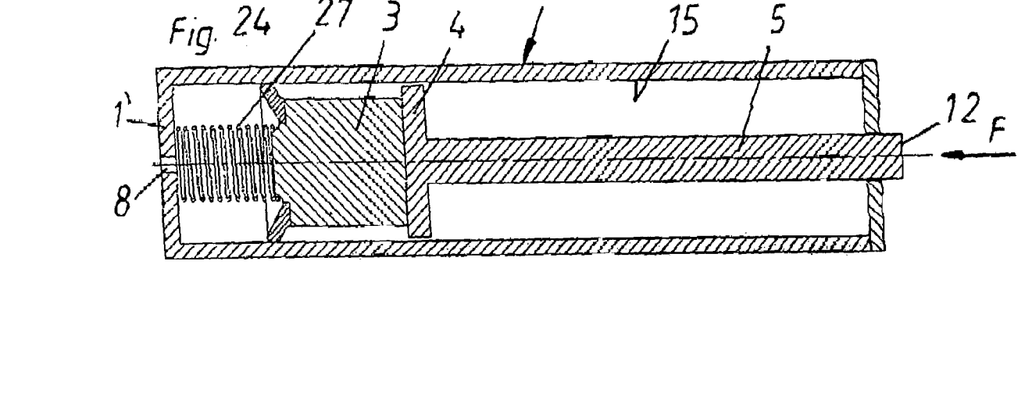

In the embodiment according to FIGS. 22 to 24, the piston part 3 and the sealing lip 7 consist of different materials. However, the sealing lip 7 is joined to the first piston part 3, for example glued or welded, so that the first piston part 3 and the sealing lip 7 can be regarded in functional terms as one piece. The advantage of this execution can be seen in that the piston part 3 and the sealing lip 7 can have different elastic properties.

Figures 25, 26:
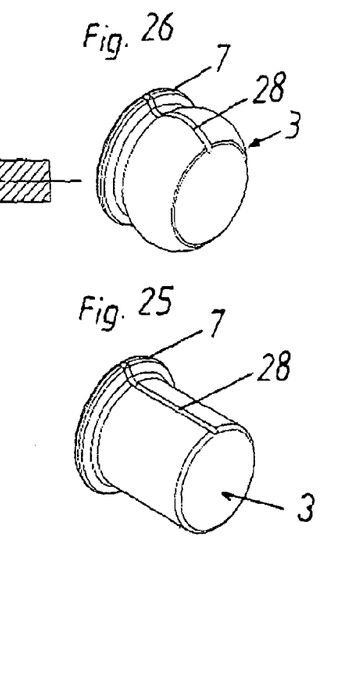
FIG. 25 is a view of a piston in the ready position.
FIG. 26 is a view of the piston during the damping process.

As can be seen from FIGS. 25 and 26, the piston part 3 can be provided with an axial groove 28 on the mantle, which enables the through-flow of the damping fluid within the cylinder 1 from one side of the piston 2 to the other side of the piston 2 during the damping process.

The inventive damper can be used, for example, in drawers, furniture doors or hatches. It can advantageously be combined with a retracting or closing device as described in the German utility model DE 202 18 067.

The invention claimed is:

1. A damper comprising:
a cylinder having a cylinder wall; and
a piston movable within said cylinder, said piston including:
a first piston part made of a rubber-elastic material, said first piston part having a radially-expandable main body portion operable to expand and substantially fill an entire cross-sectional area of said cylinder so as to contact and be pressed against said cylinder wall during a damping stroke of said damper, and having a sealing lip portion shaped and arranged to maintain a constant contact with said cylinder wall of said cylinder; and
a second piston part connected to said first piston part and made of a stiffer material as compared to said rubber-elastic material of said first piston part.

2. The damper of claim 1, wherein said second piston part is made of a rigid material.

3. The damper of claim 1, wherein said second piston part has a front recess portion, a base end of said first piston part being located in said front recess portion of said second piston part.

4. The damper of claim 1, wherein said front recess portion comprises a three-dimensionally curved recess.

5. The damper of claim 3, wherein said front recess portion comprises an approximately spherically-shaped recess.

6. The damper of claim 3, wherein said first piston part and said second piston part are shaped and arranged such that said base end of said first piston part only partially fills said front recess portion in unpressurized conditions and substantially fills said front recess portion in pressurized conditions during damping.

7. The damper of claim 1, further comprising a piston rod for acting as a ram, said second piston part being located between said first piston part and said piston rod.

8. The damper of claim 1, wherein said first piston part has a cone-shaped mantle.

9. The damper of claim 8, wherein said cone-shaped mantle is tapered toward said second piston part.

10. The damper of claim 8, wherein said cone-shaped mantle is tapered toward a distal end of said first piston part relative to said second piston part.

11. The damper of claim 1, wherein said first piston part has a base end closest to said second piston part, said base end having a graduated shape.

12. The damper of claim 1, wherein said first piston part has a base end closest to said second piston part, said base end having a snap ring groove.

13. The damper of claim 1, wherein said first piston part has a plurality of snap ring grooves spaced apart along a longitudinal axis of said first piston part, and has a plurality of piston lands, each of said piston lands being located between a respective pair of adjacent snap ring grooves.

14. The damper of claim 13, wherein a diameter of each of said piston lands is smaller in a direction approaching said second piston part.

15. The damper of claim 1, wherein said first piston part has a peg-type projection for attaching said first piston part to said second piston part.

16. The damper of claim 15, wherein said first piston part and said second piston part are shaped and arranged so that said peg-type projection is axially displaceable within said second piston part.

17. The damper of claim 1, wherein said second piston part encircles a mantle of said first piston part in a manner of a belt.

18. The damper of claim 17, wherein said second piston part comprises a network encircling said first piston part.

19. The damper of claim 1, wherein said first piston part has a cavity in an area adjacent to said second piston part, said cavity extending over less than half of an axial length of said first piston part.

20. The damper of claim 1, wherein a hardness of said first piston part is in a range between 40 A and 85 Shore.

21. The damper of claim 1, wherein said second piston part comprises a bolster plate connected to a piston rod.

22. The damper of claim 1, wherein said first piston part is monolithic such that said main body portion and said sealing lip portion have a one-piece construction.

23. The damper of claim 1, wherein said main body portion of said first piston part is made of a material having a different hardness than a material of said sealing lip portion of said first piston part.

24. The damper of claim 1, wherein said main body portion of said first piston part and said sealing lip portion of said first piston part are welded together.

25. The damper of claim 1, wherein said main body portion of said first piston part and said sealing lip portion of said first piston part are glued together.

26. The damper of claim 1, wherein said first piston part has an axial groove extending through a surface of at least said main body portion.

27. The damper of claim 1, wherein said main body portion of said first piston part has a cylindrical shape in an unpressurized condition, and has a domed shape in a pressured condition during damping.

28. The damper of claim 1, further comprising a compression spring in said cylinder, said spring having a first end abutting against a front wall of said cylinder and having a second end abutting against said piston, a spring force of said spring being such that a force of movement of said piston through said cylinder is greater than said spring force of said spring.

29. The damper of claim 1, wherein at least a portion of said second piston part is located between said first piston part and said cylinder wall with respect to a radial direction of said damper.

30. The damper of claim 1, wherein said first piston part and said cylinder are shaped and arranged such that, when said piston is not being pressurized during damping, a gap is defined between said main body portion of said first piston part and said cylinder wall of said cylinder.

31. The damper of claim 1, further comprising a piston rod connected to said second piston part for moving said piston through said cylinder, said piston rod having a plurality of axial ribs for supporting said piston rod within said cylinder.

32. A damping arrangement comprising:
a plurality of movable furniture parts; and
said damper of claim 1 arranged between a first one of said furniture parts and a second one of said furniture parts so as to dampen a relative movement between said first one of said furniture parts and said second one of said furniture parts.

33. A damper comprising:
a cylinder having a cylinder wall;
a piston movable within said cylinder, said piston including:
a first piston part made of a rubber-elastic material, said first piston part having a radially-expandable main body portion operable to expand and substantially fill an entire cross-sectional area of said cylinder so as to contact and be pressed against said cylinder wall during a damping stroke of said damper; and
a second piston part connected to said first piston part and made of a stiffer material as compared to said rubber-elastic material of said first piston part; and
a piston rod for acting as a ram, said second piston part being located between said first piston part and said piston rod.

34. The damper of claim 33, wherein said second piston part has a front recess portion, a base end of said first piston part being located in said front recess portion of said second piston part.

35. The damper of claim 33, wherein said main body portion of said first piston part is cone-shaped.

36. The damper of claim 35, wherein said cone-shaped main body portion is tapered toward said second piston part.

37. The damper of claim 35, wherein said cone-shaped main body portion is tapered toward a distal end of said first piston part relative to said second piston part.

38. The damper of claim 33, wherein said first piston part has a base end closest to said second piston part, said base end having a snap ring groove.

39. The damper of claim 33, wherein said first piston part has a plurality of snap ring grooves spaced apart along a longitudinal axis of said first piston part, and has a plurality of piston lands, each of said piston lands being located between a respective pair of adjacent snap ring grooves.

40. The damper of claim 39, wherein a diameter of each of said piston lands is smaller in a direction approaching said second piston part.

41. The damper of claim 33, wherein said first piston part has a peg-type projection for attaching said first piston part to said second piston part.

42. The damper of claim 41, wherein said first piston part and said second piston part are shaped and arranged so that said peg-type projection is axially displaceable within said second piston part.

43. The damper of claim 33, wherein said first piston part has a cavity in an area adjacent to said second piston part, said cavity extending over less than half of an axial length of said first piston part.

44. The damper of claim 33, wherein said first piston part further has a sealing lip portion shaped and arranged to maintain a constant contact with said cylinder wall of said cylinder, said first piston part being monolithic such that said main body portion and said sealing lip portion have a one-piece construction.

45. The damper of claim 33, wherein said first piston part further has a sealing lip portion shaped and arranged to maintain a constant contact with said cylinder wall of said cylinder, said main body portion of said first piston part being made of a material having a different hardness than a material of said sealing lip portion of said first piston part.

46. The damper of claim 33, wherein said first piston part has an axial groove extending through a surface of at least said main body portion.

47. The damper of claim 33, further comprising a compression spring in said cylinder, said spring having a first end abutting against a front wall of said cylinder and having a second end abutting against said piston, a spring force of said spring being such that a force of movement of said piston through said cylinder is greater than said spring force of said spring.

48. The damper of claim 33, wherein at least a portion of said second piston part is located between said first piston part and said cylinder wall with respect to a radial direction of said damper.

49. The damper of claim 33, wherein said first piston part and said cylinder are shaped and arranged such that, when said piston is not being pressurized during damping, a gap is defined between said main body portion of said first piston part and said cylinder wall of said cylinder.

50. The damper of claim 33, further comprising a piston rod connected to said second piston part for moving said piston through said cylinder, said piston rod having a plurality of axial ribs for supporting said piston rod within said cylinder.

51. A damping arrangement comprising:
a plurality of movable furniture parts; and
said damper of claim 33 arranged between a first one of said furniture parts and a second one of said furniture parts so as to dampen a relative movement between said first one of said furniture parts and said second one of said furniture parts.

* * * * *